(12) United States Patent
Kim et al.

(10) Patent No.: US 9,324,436 B2
(45) Date of Patent: Apr. 26, 2016

(54) METHOD AND APPARATUS FOR CONTROLLING OPERATION OF FLASH MEMORY

(71) Applicant: ELECTRONICS AND TELECOMMUNICATIONS RESEARCH INSTITUTE, Daejeon (KR)

(72) Inventors: Moon-Seok Kim, Daejeon (KR); Sang-Kyung Yoo, Daejeon (KR); Sanghan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 14/336,699

(22) Filed: Jul. 21, 2014

(65) Prior Publication Data
US 2015/0055417 A1    Feb. 26, 2015

(30) Foreign Application Priority Data
Aug. 26, 2013 (KR) .................. 10-2013-0101199

(51) Int. Cl.
| | |
|---|---|
| *G11C 16/10* | (2006.01) |
| *G11C 16/04* | (2006.01) |
| *G11C 16/14* | (2006.01) |
| *G06F 7/58* | (2006.01) |
| *G06F 21/44* | (2013.01) |

(Continued)

(52) U.S. Cl.
CPC ........ *G11C 16/10* (2013.01); *G06F 7/58* (2013.01); *G06F 7/588* (2013.01); *G06F 21/44* (2013.01); *G09C 1/00* (2013.01); *H04L 9/3278* (2013.01); *G11C 16/0408* (2013.01)

(58) Field of Classification Search
CPC ........ G11C 16/22; G11C 7/06; G11C 11/161; G11C 11/1673; G11C 11/1675; G11C 16/10; G11C 16/04; G11C 16/14
See application file for complete search history.

(56) References Cited

U.S. PATENT DOCUMENTS

| | | | |
|---|---|---|---|
| 2011/0317829 | A1 | 12/2011 | Ficke et al. |
| 2012/0230087 | A1 | 9/2012 | Chellappa et al. |

(Continued)

FOREIGN PATENT DOCUMENTS

| | | |
|---|---|---|
| KR | 10-2012-0026974 A | 3/2012 |
| WO | 2012/033385 A2 | 3/2012 |
| WO | 2012/164986 A2 | 12/2012 |

OTHER PUBLICATIONS

Yinglei Wang et al., "Flash Memory for Ubiquitous Hardware Security Functions: True Random Number Generation and Device Fingerprints," S&P, 2012 IEEE Symposium.

(Continued)

*Primary Examiner* — Hien Nguyen
(74) *Attorney, Agent, or Firm* — LRK Patent Law Firm

(57) ABSTRACT

A method and apparatus for controlling the operation of flash memory are provided. The apparatus for controlling the operation of flash memory includes a control unit and a voltage adjustment unit. The control unit outputs a control signal adapted to change one or more of the program, erase and read voltage conditions for the flash memory to the voltage adjustment unit in response to the input of a PUF mode selection signal. The voltage adjustment unit changes the one or more of the program, erase and read voltage conditions for the flash memory in response to the input of the control signal.

16 Claims, 3 Drawing Sheets

(51) Int. Cl.
  *H04L 9/32* (2006.01)
  *G09C 1/00* (2006.01)

(56) References Cited

U.S. PATENT DOCUMENTS

| | | | |
|---|---|---|---|
| 2013/0106461 A1 | 5/2013 | Ficke et al. | |
| 2014/0126306 A1* | 5/2014 | Otterstedt | G11C 7/06 365/189.07 |
| 2015/0070979 A1* | 3/2015 | Zhu | G09C 1/00 365/158 |

OTHER PUBLICATIONS

Pravin Prabhu et al., "Extracting Device Fingerprints from Flash Memory by Exploiting Physical Variations," 4th International Conference, Trust, 2011.

* cited by examiner

METHOD AND APPARATUS FOR CONTROLLING OPERATION OF FLASH MEMORY

CROSS-REFERENCE TO RELATED APPLICATION

This application claims the benefit of Korean Patent Application No. 10-2013-0101199, filed on Aug. 26, 2013, which is hereby incorporated by reference herein in its entirety.

BACKGROUND OF THE INVENTION

1. Technical Field

The present disclosure relates generally to a method and apparatus for controlling the operation of flash memory and, more particularly, to a technology that is capable of implementing an unclonable integrated circuit by controlling the various types of operations of flash memory.

2. Description of the Related Art

Even when the same type of electronic devices are fabricated using the same fabrication process, differences inevitably occur between the physical or electrical parameters of the devices. Devices that generate theoretically unpredictable results using the unpredictable differences in a fabrication process and have the intrinsic characteristics of the corresponding devices are referred to as Physically Unclonable Function (PUF) circuits.

Accordingly, a PUF circuit using NAND flash memory having the highest level integration of current semiconductor devices and a variety of characteristics are disclosed.

As a related technology, a technology of implementing a PUF circuit using the operation of the access circuits of SRAM and SRAM is disclosed in U.S. Patent Application Publication No. 2012-0230087 entitled "SRAM Circuits for Circuit Identification using a Digital Fingerprint."

In the technology disclosed in U.S. Patent Application Publication No. 2012-0230087, the implementation of a SRAM cell as a PUF circuit is achieved using the phenomenon in which, when some of SRAM cells are turned off and on, a SRAM cell in a meta-stable state determines a resulting value in a logically stable state of HIGH/LOW. The access circuit of SRAM provides a selective profile of HIGH/LOW, and the SRAM-based PUF circuit is based on this selective profile.

Meanwhile, the technology disclosed in U.S. Patent Application Publication No. 2012-0230087 uses SRAM, which is different from a semiconductor adopted in the present invention in terms of the type of semiconductor.

As another related technology, a technology of implementing a PUF circuit using the physical characteristics of NAND flash memory is disclosed in the paper "Extracting Device Fingerprints from Flash Memory by Exploiting Physical Variations" by Pravin Prabhu, Ameen Akel, Laura M. Grupp, Wing-Kei S. Yu, G. Edward Suh, Edwin Kan, and Steven Swanson in the 4th international conference TRUST 2011.

The technology proposed by Pravin Prabhu et al. is configured to implement a PUF circuit using the correlation difference between the same word and a different block or chip element by means of the intrinsic characteristics of NAND flash, such as program disturbance and reading disturbance. However, when a PUF circuit is implemented using the program and reading disturbance characteristics, a problem occurs in the endurance characteristics of flash memory, or it takes a few or more hours to generate a significant correlation difference.

As still another related technology, a technology of implementing a commercial flash memory-based random number generator and a PUF circuit is disclosed in the paper "Flash Memory for Ubiquitous Hardware Security Functions: true random number generation and device fingerprints" by Yinglei Wang, Wing-kei Yu, Shuo Wu, Greg Malysa, G. Edward Suh, and Edwin C. Kan in the Security and Privacy (SP) of 2012 IEEE Symposium.

In this paper, the flash memory-based random number generator and the PUF circuit are implemented using the processing differences of flash memory unit cells, such as the differences in doping concentration, the thickness of the insulator of a floating gate, and the coupling ratio of a control gate. Furthermore, the flash memory-based random number generator and the PUF circuit are implemented using a method for stopping programming by issuing a reset command during incremental step pulse programming (ISPP), thereby establishing a meta-stable state.

As described above, the technology proposed by Yinglei Wang et al. is configured to cause a flash memory device performing a program operation using an ISPP method to enter a partial programming state by issuing a reset command during ISPP programming and to then implement a PUF circuit.

The ISPP method is a program method that enables the distribution of threshold voltages of flash memory to be reduced, thereby reducing the errors of flash memory. However, the ISPP method is not required for operation as a PUF circuit, and makes the performance of flash memory more complicated. Therefore, there is a need for the implementation of a flash memory-based PUF circuit that can be simply implemented without using an ISPP method and a reset function.

SUMMARY OF THE INVENTION

Accordingly, at least one embodiment of the present invention is intended to provide a method and apparatus for controlling the operation of flash memory, which enable flash memory to operate as a PUF circuit by changing only one or more voltage conditions of a flash memory controller.

In accordance with an aspect of the present invention, there is provided a method of controlling the operation of flash memory, including outputting, by a control unit, a control signal adapted to change one or more of the program, erase and read voltage conditions for the flash memory to a voltage adjustment unit in response to the input of a PUF mode selection signal; and changing, by the voltage adjustment unit, the one or more of the program, erase and read voltage conditions for the flash memory in response to the input of the control signal.

The program voltage condition may include the voltage level and pulse duration of a single pulse that is applied when a program operation is performed on the flash memory.

The program voltage condition may be the application of voltage level or pulse duration lower or shorter than that of the program voltage condition of common flash memory.

The read voltage condition may include the level of a read reference voltage that is used to distinguish logical values 0 and 1 from each other.

The read reference voltage may be set to the average or median value of the distribution of threshold voltages of the flash memory that is generated when voltage level or pulse duration lower or shorter than that of the program voltage condition of common flash memory.

The program voltage condition may be identical to the program voltage condition of common flash memory.

The average or median value of the distribution of threshold voltages of the flash memory that has executed a program command based on the program voltage condition may be set as a read reference voltage included in the read voltage condition.

The erase voltage condition may include the voltage level and pulse duration of a single pulse that is applied when an erase operation is performed on the flash memory.

The average or median value of the distribution of threshold voltages of the flash memory that has executed an erase command based on the erase voltage condition may be set as a read reference voltage included in the read voltage condition.

In accordance with another aspect of the present invention, there is provided an apparatus for controlling the operation of flash memory, including a control unit configured to output a control signal adapted to change one or more of the program, erase and read voltage conditions for the flash memory to a voltage adjustment unit in response to the input of a PUF mode selection signal; and the voltage adjustment unit configured to change the one or more of the program, erase and read voltage conditions for the flash memory in response to the input of the control signal.

The program voltage condition may include the voltage level and pulse duration of a single pulse that is applied when a program operation is performed on the flash memory.

The program voltage condition may be the application of voltage level or pulse duration lower or shorter than that of the program voltage condition of common flash memory.

The read voltage condition may include the level of a read reference voltage that is used to distinguish logical values 0 and 1 from each other.

The read reference voltage may be set to the average or median value of the distribution of threshold voltages of the flash memory that is generated when voltage level or pulse duration lower or shorter than that of the program voltage condition of common flash memory.

The program voltage condition may be identical to the program voltage condition of common flash memory.

The average or median value of the distribution of threshold voltages of the flash memory that has executed a program command based on the program voltage condition may be set as a read reference voltage included in the read voltage condition.

The erase voltage condition may include the voltage level and pulse duration of a single pulse that is applied when an erase operation is performed on the flash memory.

The average or median value of the distribution of threshold voltages of the flash memory that has executed an erase command based on the erase voltage condition may be set as a read reference voltage included in the read voltage condition.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
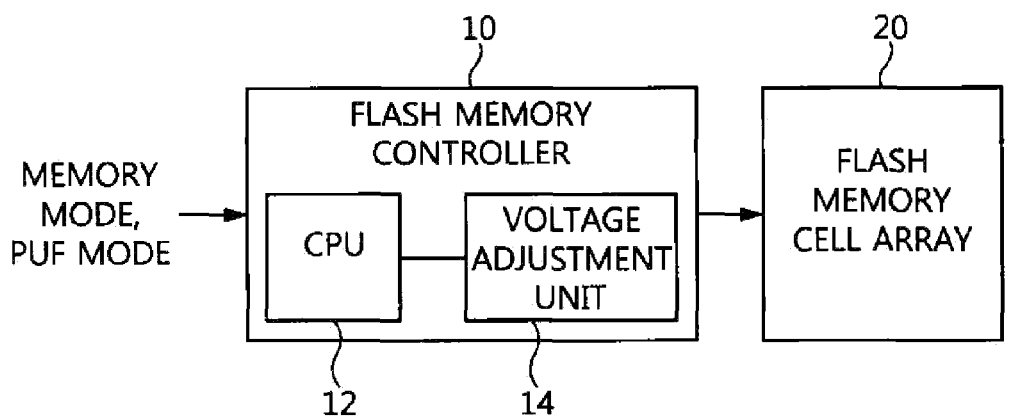
FIG. 1 is a diagram illustrating the configuration of a flash memory device corresponding to an unclonable device according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

FIG. 1 is a diagram illustrating the configuration of a flash memory device corresponding to an unclonable device according to an embodiment of the present invention. The flash memory device illustrated in FIG. 1 may be considered to be an unclonable device.

The present invention proposes an operation method for implementing a flash memory-based PUF circuit capable of generating unpredictable responses using the facts that the difference in the thickness of the insulator of a flash memory cell inevitably occurs in a fabrication process and the tunneling of electrons can be described using only the probability distribution of quantum mechanics.

An unclonable device according to an embodiment of the present invention has a physical unclonable function (PUF). A PUF may be utilized in the case where a slight difference between semiconductors that inevitably occurs in a fabrication process and cannot be predicted nor controlled leads to a significant difference between resulting values. As a result, semiconductor chips exhibit different resulting values, which may be used to perform the authentication of semiconductors and prevent the forgery of semiconductors, like the fingerprints of humans.

In general, flash memory devices are classified into NAND flash memory devices in which cell transistors are arranged in series between bit lines and ground and NOR flash memory devices in which cell transistors are arranged in parallel between bit lines and ground based on the structures of memory cell arrays.

The following description is given on the assumption that the flash memory device illustrated in FIG. 1 is, for example, a NAND flash memory device.

The flash memory device illustrated in FIG. 1 includes a flash memory controller 10 and a flash memory cell array 20.

The flash memory cell array 20 includes flash memory cells (for example, cell transistors), which are basic units for storing data. In this case, the flash memory cell array 20 may be considered to be a common flash memory cell array. The programming and erasure of a NAND flash memory device are performed by controlling the threshold voltage of each flash memory cell while injecting or discharging electrons into or from a floating gate using an F-N tunneling method. In this case, the term "programming" refers to an operation of writing data into a flash memory cell, and the term "erasure" refers to an operation of erasing data written into a flash memory cell. In other words, data is written into or erased from a flash memory cell using a method of loading or discharging electrons into or from a floating gate by applying a high voltage sufficient to generate the tunnel effect. Furthermore, written data is read by a method of measuring and analyzing the amount of charge of a floating gate via a bit line. Accordingly, an operation of loading electrons into a floating gate may be considered to be a write operation (that is, programming), an operation of discharging electrons from a floating gate may be considered to be an erase operation, an operation of measuring the amount of charge of an electron floating gate may be considered to be a read operation.

The above-described flash memory cell or flash memory cell array 20 may be an example of the flash memory set forth in the claims of the present application.

The flash memory controller 10 issues commands to the flash memory cell array 20. The flash memory controller 10 performs a common memory management operation or operates the flash memory cells as a PUF circuit based on an input mode selection signal (for example, a signal selecting any one of memory mode and PUF mode). In this case, the common memory management operation may be the above-described program, erase, or read operation. Furthermore, in order to operate the flash memory cells as a PUF circuit, the flash memory controller 10 sets the program, erase and/or read voltage conditions to values different from those of a common flash memory device. The program voltage condition may include the voltage level and pulse duration of a single pulse that is applied when a program operation is performed on flash memory cells, and the erase voltage condition may include the voltage level and pulse duration of a single pulse that is applied when an erase operation is performed on flash memory cells. Furthermore, the read voltage condition may include a read reference voltage level that is used to distinguish logical values 0 and 1 from each other.

The flash memory controller 10 includes a CPU 12 and a voltage adjustment unit 14.

If the input mode selection signal corresponds to memory mode, the CPU 12 performs control so that a program, erase or read operation is performed on the flash memory cell array 20 based on a corresponding condition (a previously stored program, erase or read voltage condition) of a common flash memory device. Meanwhile, if the input mode selection signal corresponds to PUF mode, the CPU 12 outputs a control signal to the voltage adjustment unit 14 so that one or more of program, erase and read voltage conditions for the flash memory cells are changed to values different from those of a common flash memory device, in order to operate the flash memory cells as a PUF circuit. In this case, the CPU 12 may be considered to be a control unit.

The voltage adjustment unit 14 adjusts one or more of program, erase and read voltage conditions for the flash memory cells to values different from those of a common flash memory device based on the control signal of the CPU 12. Furthermore, the voltage adjustment unit 14 notifies the CPU 12 of the results of the adjustment. Accordingly, the CPU 12 is provided with the results of the adjustment by the voltage adjustment unit 14, and thus may use the previously stored results of the adjustment if necessary.

The above-described program, erase and read voltage conditions may be set by a user as desired, or may be configured to be automatically changed by a system when a user selects memory mode or PUF mode.

Figure 2:
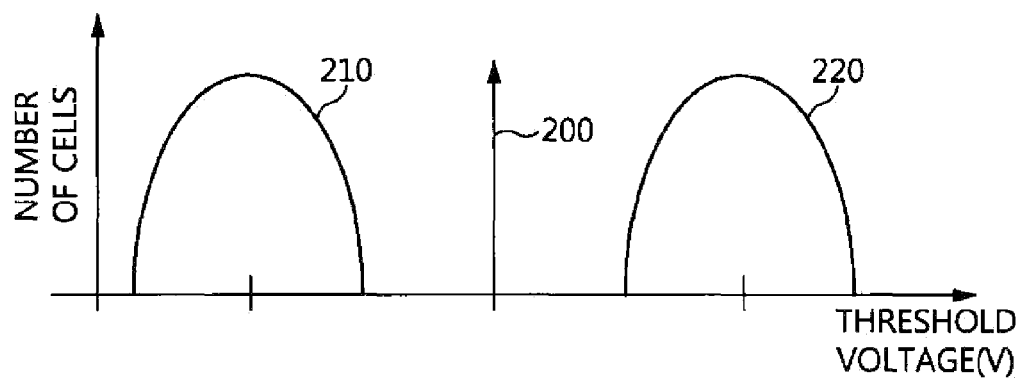
FIG. 2 is a diagram illustrating the distribution of threshold voltages and the location of a read reference voltage of common flash memory cells in the case of single-level cells.

FIG. 2 is a diagram illustrating the distribution of threshold voltages and the location of a read reference voltage of common flash memory cells in the case of single-level cells.

A read reference voltage 200 is set in a voltage section between a program state and an erase state by considering the magnitude of the distribution (dispersion) of threshold voltages generated by common flash memory cells in the case of single-level cells. The case where a threshold voltage is higher than the read reference voltage 200 is recognized as logical value "1," while the case where the threshold voltage is lower than the read reference voltage 200 is recognized as logical value "0." In FIG. 2, reference numeral 210 designates the curve of the distribution of threshold voltages of the flash memory cells that have executed an erase command, and reference numeral 220 designates the curve of the distribution of threshold voltages of the flash memory cells that have executed a program command.

In FIG. 2, a region that distinguishes a programmed state and an erased state from each other is set as the read reference voltage 200. Furthermore, the case where the threshold voltage is higher than the read reference voltage 200 logically recognized as "1," and the case where the threshold voltage is lower than the read reference voltage 200 is logically recognized as 0. Accordingly, the logical value of flash memory cells corresponding to the threshold voltage distribution curve 210 is recognized as "0," and the logical value of flash memory cells corresponding to the threshold voltage distribution curve 220 is recognized as "1."

As described above, when one bit is stored for each flash memory cell, two states (an erase state and a program state) may be identified. In this case, a single program state is present, and thus a corresponding cell is referred to as a single-level cell (SLC).

Meanwhile, two-hit data may be represented with a total of four distinctive states 00, 01, 10, and 11 including an erase state. In this case, two or more programmed states are present, and thus a corresponding cell is referred to as a multi level cell (MLC).

Since the physical characteristics of flash memory cells used to store data are not the same, even flash memory cells that store the same data have different threshold voltage values, and thus the distributions of threshold voltages are formed, as illustrated in FIG. 2. Furthermore, if the range of the distribution of each program state is wide, the overlap between adjacent program states increases. The number of errors is proportional to the size of the overlap, and thus a large number of errors make the recovery of original data more difficult. Accordingly, a voltage margin that separates states is essentially required between one state and another state. Usually, the broader the voltage margin is, the better. In order to increase the voltage margin, the distribution of threshold voltages of flash memory cells needs to be reduced under a given program or erase voltage condition.

In the present invention, a PUF circuit is designed using the inevitable distribution (dispersion) of threshold voltages when single voltage pulses are applied to flash memory cells, as illustrated in FIG. 2.

The present invention uses the method of operating flash memory cells, as illustrated in FIG. 2. A method of operating flash memory cells as a PUF circuit is described in greater detail below.

Figure 3:
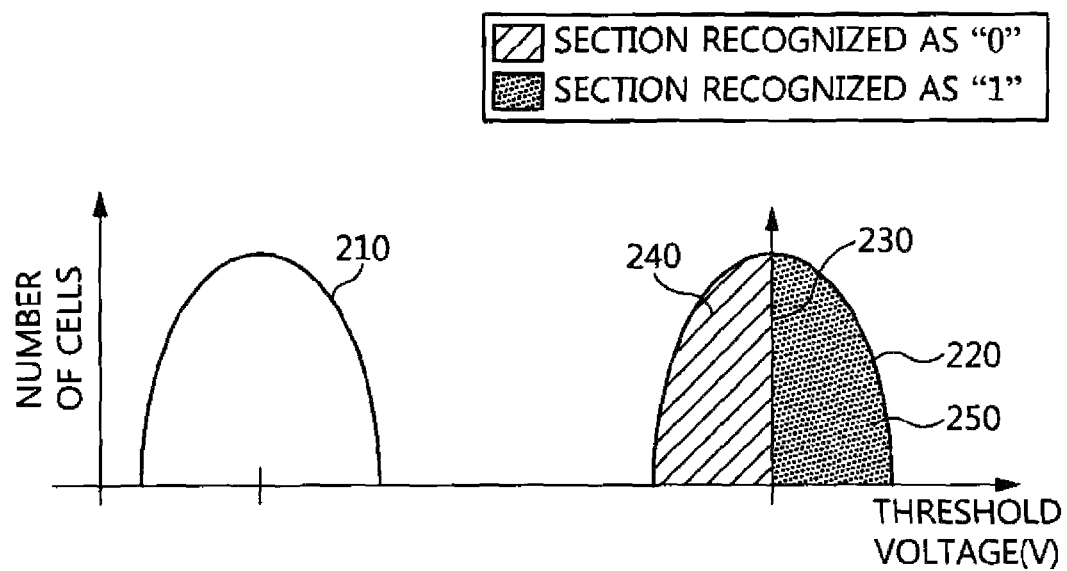
FIG. 3 is a diagram illustrating a method of setting the median of the distribution of programmed threshold voltages as a read reference voltage, which is the principal concept of the present invention, thereby implementing an unclonable device.
Figure 4:
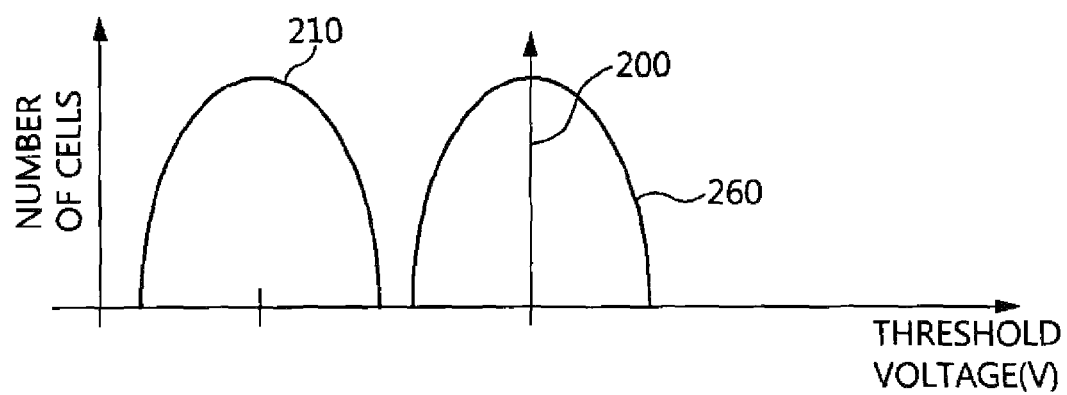
FIG. 4 is a diagram illustrating a PUF operation of reducing variation in the threshold voltages of flash memory cells by applying relatively low voltage, thereby making it impossible to predict 0 or 1.
Figure 5:
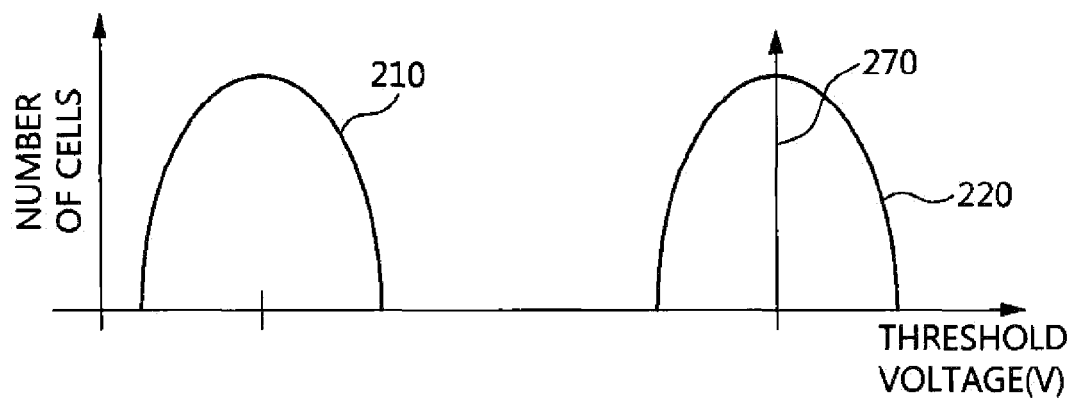
FIG. 5 is a diagram illustrating a PUF operation of setting a read reference voltage to a value higher than the voltage of common flash memory cells after programming using the voltage of the common flash memory cells, thereby making it impossible to predict 0 or 1.

FIG. 3 is a diagram illustrating a method of setting the median of the distribution of programmed threshold voltages as a read reference voltage, which is the principal concept of the present invention, thereby implementing an unclonable device. FIG. 4 is a diagram illustrating a PUF operation of reducing variation in the threshold voltages of flash memory cells by applying relatively low voltage, thereby making it impossible to predict 0 or 1. FIG. 5 is a diagram illustrating a PUF operation of setting a read reference voltage to a value higher than the voltage of common flash memory cells after programming using the voltage of the common flash memory cells, thereby making it impossible to predict 0 or 1.

In the present invention, the read reference voltage 230 is set to the average or median value of the distribution of threshold voltages, as illustrated in FIG. 3. Furthermore, the present invention uses the characteristic in which it is impossible to predict logical value "1" or "0" even when flash memory cells fabricated under the same processing conditions are made to enter a program state using the same program voltage condition. In this case, the program voltage condition refers to voltage level and pulse duration when a single voltage pulse is applied.

In FIG. 3, the read reference voltage 230 is set to the median of the distribution of threshold voltages of a program state in order to support a PUF operation. In FIG. 3, reference numeral 240 designates a threshold voltage section that belongs to the distribution of the threshold voltages of the program state and is recognized as logical value "0" due to the PUF operation, and reference numeral 250 designates a threshold voltage section that belongs to the distribution of threshold voltages of the program state and is recognized as logical value "1" due to the PUF operation.

Methods of setting the read reference voltage 230 to the average or median value of the distribution (dispersion) of threshold voltages, as illustrated in FIG. 3, may be divided into two methods.

In a first method, the level of a read reference voltage 200 follows the criterion of common flash memory cells, as illustrated in FIG. 4. Furthermore, the read reference voltage 200 is set to the average or median value of the distribution (dispersion) of threshold voltages by changing a program voltage condition so that voltage level or pulse duration lower or shorter than that of the program voltage condition of the common flash memory cells is applied. In FIG. 4, reference numeral 260 designates the curve of the distribution of threshold voltages of flash memory cells that have executed a program command using a low voltage value in order to perform a PUF operation.

In a second method, a program voltage condition follows the criterion of common flash memory cells, as illustrated in FIG. 5. Furthermore, a read reference voltage 270 may be set to the average or median value of the distribution of threshold voltages by changing the read reference voltage 270. In FIG. 5, the read reference voltage 270 is set to a voltage level higher than that of the common flash memory cells in order to perform a PUF operation.

The methods of setting a read reference voltage to the average or median value of the distribution of threshold voltages after flash memory cells have executed a program command have been described.

As illustrated in FIG. 2, the distribution of threshold voltages of flash memory cells is present after an erase command as well as a program command has been executed.

Figure 6:
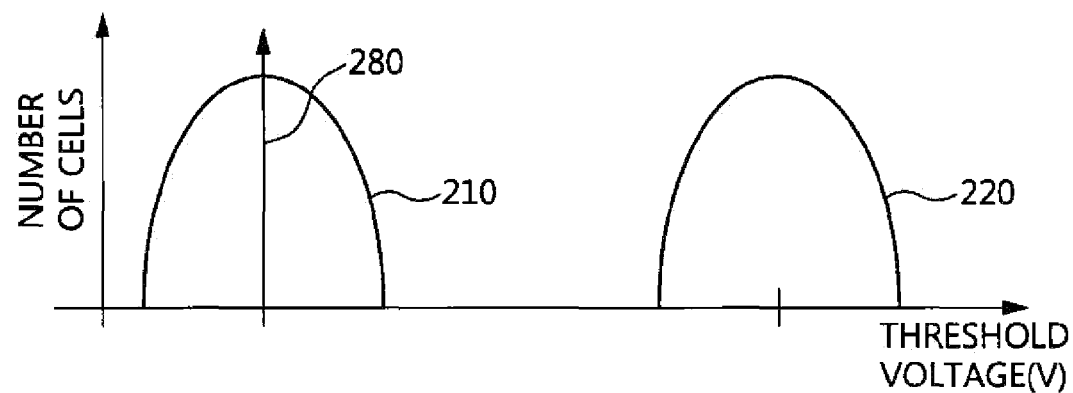
FIG. 6 is a diagram illustrating a PUF operation in which a read reference voltage has been set to the median or average value of the distribution of threshold voltages of an erase state and thus it is impossible to predict 0 or 1.

That is, the method of setting a read reference voltage to the average or median value of the distribution of threshold voltages after the execution of a program command, thereby enabling flash memory cells to operate as a PUF circuit, has been described above. In the same manner, as illustrated in FIG. 6, a read reference voltage is set to the average or median value of the distribution of threshold voltages after the execution of an erase command, thereby enabling flash memory cells to operate as a PUF circuit. FIG. 6 is a diagram illustrating a PUF operation in which a read reference voltage has been set to the median or average value of the distribution of threshold voltages of an erase state and thus it is impossible to predict 0 or 1. In FIG. 6, reference numeral 280 designates a read reference voltage at a voltage level lower than that of common flash memory cells in order to perform a PUF operation.

In order for the flash memory controller 10 illustrated in FIG. 1 to operate flash memory cells as a PUF circuit, a program voltage condition, an erase voltage condition and a read reference voltage level have values different from those of common flash memory cells.

However, since the flash memory cell array 20 has the same structure as a common flash memory cell array, the same cells may be selectively operated as flash memory cells and a PUF circuit. In order to implement this, two methods may be used. The first method is implemented in such a manner that memory mode and PUF mode are set up based on a system and, for example, when a user issues a command in PUF mode, the CPU 12 of the flash memory controller 10 changes the program voltage condition, the erase voltage condition and the read reference voltage by controlling the voltage adjustment unit 14. The second method is to construct a system so that a user can change the program voltage condition, erase voltage condition and read reference voltage of the flash memory controller 10 as desired.

In accordance with the present invention configured described above, a PUF circuit can be implemented based on flash memory, which has the highest integration level of memory electronic devices. Accordingly, it is easy to implement a PUF circuit having a size smaller than those of PUF circuits using other existing static random access memory.

Additionally, a PUF circuit can be implemented based on a single program voltage pulse scheme, rather than an ISPP method, by adjusting only the function of the flash memory controller of an existing flash memory device.

The flash memory-based PUF circuit also has high-level integration, fast reading speed, and low power, which are the existing advantages of flash memory. This may be used to perform the authentication of semiconductor chips and prevent the forgery of semiconductors, like other PUF circuits.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of controlling operation of flash memory, comprising:

outputting, by a control unit, a control signal adapted to change one or more of program, erase and read voltage conditions for the flash memory to a voltage adjustment unit in response to input of a PUF mode selection signal; and changing, by the voltage adjustment unit, the one or more of the program, erase and read voltage conditions for the flash memory in response to input of the control signal, wherein the program voltage condition includes voltage level and pulse duration of a single pulse that is applied when a program operation is performed on the flash memory.

2. The method of claim 1, wherein the program voltage condition is application of voltage level or pulse duration lower or shorter than that of a program voltage condition of common flash memory.

3. The method of claim 1, wherein the read voltage condition includes a level of a read reference voltage that is used to distinguish logical values 0 and 1 from each other.

4. The method of claim 3, wherein the read reference voltage is set to an average or median value of a distribution of threshold voltages of the flash memory that is generated when voltage level or pulse duration lower or shorter than that of a program voltage condition of common flash memory.

5. The method of claim 1, wherein the program voltage condition is identical to a program voltage condition of common flash memory.

6. The method of claim 5, wherein an average or median value of a distribution of threshold voltages of the flash memory that has executed a program command based on the program voltage condition is set as a read reference voltage included in the read voltage condition.

7. The method of claim 1, wherein the erase voltage condition includes voltage level and pulse duration of a single pulse that is applied when an erase operation is performed on the flash memory.

8. The method of claim 7, wherein an average or median value of a distribution of threshold voltages of the flash memory that has executed an erase command based on the erase voltage condition is set as a read reference voltage included in the read voltage condition.

9. An apparatus for controlling operation of flash memory, comprising:

a control unit configured to output a control signal adapted to change one or more of program, erase and read voltage conditions for the flash memory to a voltage adjustment unit in response to input of a PUP mode selection signal; and the voltage adjustment unit configured to change the one or more of the program, erase and read voltage conditions for the flash memory in response to input of the control signal, wherein the program voltage condition includes voltage level and pulse duration of a single pulse that is a applied when a program operation is performed on the flash memory.

10. The apparatus of claim 9, wherein the program voltage condition is application of voltage level or pulse duration lower or shorter than that of a program voltage condition of common flash memory.

11. The apparatus of claim 9, wherein the read voltage condition includes a level of a read reference voltage that is used to distinguish logical values 0 and 1 from each other.

12. The apparatus of claim 11, wherein the read reference voltage is set to an average or median value of a distribution of threshold voltages of the flash memory that is generated when voltage level or pulse duration lower or shorter than that of a program voltage condition of common flash memory.

13. The apparatus of claim 9, wherein the program voltage condition is identical to a program voltage condition of common flash memory.

14. The apparatus of claim 13, wherein an average or median value of a distribution of threshold voltages of the flash memory that has executed a program command based on the program voltage condition is set as a read reference voltage included in the read voltage condition.

15. The apparatus of claim 9, wherein the erase voltage condition includes voltage level and pulse duration of a single pulse that is applied when an erase operation is performed on the flash memory.

16. The apparatus of claim 15, wherein an average or median value of a distribution of threshold voltages of the flash memory that has executed an erase command based on the erase voltage condition is set as a read reference voltage included in the read voltage condition.

* * * * *